Patented July 11, 1933

1,917,685

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

No Drawing.  Application filed July 29, 1930. Serial No. 471,588.

This invention relates to the production of elemental sulphur, and has for its object the recovery of elemental sulphur from gases containing sulphur compounds such as sulphur dioxide. More particularly, the invention relates to an improved and economical process for obtaining sulphur in the elemental form from roaster or smelter gases.

It has been proposed heretofore to recover elemental sulphur from sulphur dioxide by means of carbonaceous reducing agents, for example, by passing sulphur dioxide through beds of incandescent coke. The processes which have been suggested for that purpose, however, have met with little commercial success, because of various technical and economic deficiencies which they present.

These deficiencies can be ascribed to a considerable extent, to the fact that the various operating procedures suggested for carrying out these processes, have not given due consideration to certain technical factors in the general operation which we have found to be of considerable importance, and likewise the selection and manner of use of the carbonaceous material, have not been properly considered from an economical standpoint, for example the use of beds of coke through which large volumes of gas must be passed, with the necessary maintenance of suitably high temperature by external means.

We have found that by treating roaster or smelter gases with reducing gases such as water gas, producer gas, natural gas or the like, or with a suspension of powdered carbonaceous fuel, with proper control of the temperatures of the reacting materials, the rate of gas flow and other factors as pointed out hereinafter, we can obtain a very high yield of the elemental sulphur sought.

In carrying out the process of our invention, the roaster or smelter gases are first taken directly from the roaster or smelter and are not subjected to a cooling operation, and under such conditions their temperature is ordinarily quite high, in the neighborhood of 800° C. or higher for example.

These hot gases are then preferably freed from dust and the like by suitable apparatus which is substantially insulated to retain the heat. The dust collector may be of any suitable well known mechanical type, for example a baffle chamber, or if desired, it may consist of a precipitator of the electrostatic type, such as the well known Cottrell precipitator.

The dust collection means also may consist of both a mechanical dust collector for removing the coarse dust, followed by an electrostatic precipitator for removing the fine dust, the combination of the two permitting the dust-removal operation to be carried out with greater facility.

While some of the sensible heat might conceivably be lost in the passage of the hot roaster gases through the dust collectors, the same can be considerably minimized by increasing the velocity of flow of the gases as noted hereinafter. In addition, supplemental heat to compensate for any heat lost may be furnished, if necessary, prior to reaction of the gases with the carbonaceous reducing agent.

After leaving the dust collector, the hot roaster gases are then introduced into a reduction chamber, which has been previously pre-heated by burning fuel gas or oil therein. Concurrently with the introduction of the sulphur dioxide gas, the carbonaceous reducing agent either as water gas, producer gas, natural gas, powdered coal in gaseous suspension or the like, or mixtures of the same, is also introduced, in suitable proportion and at an appropriate temperature.

The reduction chamber may be made of fire brick or the like, and is preferably provided with a suitable checker-work to promote the intermingling of the gases and retention of heat in the chamber. The walls of the chamber should be of a highly insulating nature to prevent dissipation of the heat therein.

The temperature of the gases in the reduction chamber should be sufficiently high, for example, approximately 1000° C. and preferably above, to cause the reaction between the $SO_2$ and the reducing agent to proceed very rapidly to substantial completion.

In accordance with our invention, this temperature is maintained insofar as possible by the heat evolved in the process of sulphur recovery.

Where producer gas, water gas and natural gas are the reagents used, the reaction with the sulphur dioxide is quite strongly exothermic, substantial amounts of heat being liberated thereby in the reduction chamber, and with the provision of a suitably elevated initial temperature, obtained by preheating one or both of the reacting gases if necessary, the sulphur producing reactions are practically self-sustaining and proceed very rapidly, a matter of but a few seconds being required for substantial completion.

In the case of powdered fuel however, the reaction between this carbonaceous reducing agent and the sulphur dioxide gases is not self-sustaining and requires the provision of external heat. This heat is preferably supplied by the combustion of a supplementary portion of the reducing agent used. For this purpose additional amounts of air or other oxidizing gas may, if necessary, be introduced into the reduction chamber to burn the additional quantity of reducing agent.

A similar auxiliary-combustion expedient may likewise be resorted to for the water gas, etc. if necessary or desirable.

When the reactions are carried out as noted, no external heating of the reduction chamber is necessary.

Moreover, by suitable transmission of the heat of the exit gases from the reduction chamber to the gases entering the chamber, as noted hereinafter, the auxiliary combustion or other supplemental heating may be partly or wholly dispensed with.

In order that the proper temperature conditions aforenoted be maintained, and not drop to an undesirable degree prior to completion of the reaction, the rate of flow of the gases should be regulated so that heat losses are reduced as much as possible. Where the temperature conditions and the speed of reaction are high, the rate of flow should be greater than when they are low.

The rate of flow can be controlled by the provision of suitable fan blowers located either in advance of the reduction chamber, or at the discharge end thereof, or at both ends if desired, and a suitable manometer and temperature indicator may be provided for the ascertainment of the prevailing conditions of gas velocity and temperature.

When the reaction in the reduction chamber is properly carried out, the temperature of the reacted exit gases is very high, and the considerable sensible heat therein may be utilized to preheat either or both the reducing gases and/or the sulphur dioxide gases, which are to be conducted into the reduction chamber.

The temperature of the sulphur dioxide gases is generally sufficiently high however, that it usually is expedient to limit the heat exchange simply to preheating the relatively cool reducing gases, although such relative expediency is sometimes reversed or substantially modified.

The necessity or advisability of preheating, whether by such heat exchange or by auxiliary combustion, and the manner and degree of such heating, will in general be determined by the particular reducing agent used and the specific temperature and associated conditions existing in the operation at the time.

As regards the gaseous reducing agents, viz: water gas, producer gas and natural gas, the two first-named gases are required in relatively large volume and consequently had best be substantially preheated, in order to reduce the amount of sensible heat they would otherwise absorb when introduced into the reduction chamber. In the case of natural gas, the relatively small volume required renders its preheating less strongly indicated, although it may be restorted to if necessary or desired.

When the powdered carbonaceous fuel is used, it is generally advisable that this reagent be substantially heated by auxiliary combustion and/or heat exchange with the exit gases to provide the heat necessary for its practically more or less endothermic reaction with the sulphur dioxide.

The heat exchange with the exit gases may be accomplished in any well known type apparatus and in the case of the powdered fuel, a gaseous suspension of the same is preferably blown through the heat exchanger quite vigorously in order to avoid the entrained carbon being deposited in the apparatus.

When air or other combustion supporting gas is used as the suspending gas for the powdered fuel or other solid carbon during its passage through the heat exchanger, the combustion of a portion of the carbon will be initiated by the heat so absorbed, a surplus of carbon being provided for such auxiliary combustion, and consequently the suspension should be quickly passed from the heat exchanger to the reduction chamber with suitable heat insulation in passage, in order to avoid in so far as possible the loss of this auxiliary heat in transit. If desired, the powdered fuel may be suspended, for the period of its passage through the heat exchanger, in a gas which is entirely non-oxidizing or inert, or more so than air, in order that the heat of auxiliary combustion will not be prematurely liberated. Under such circumstances, the air or other oxidizing gases for the auxiliary combustion is subsequently introduced into the gaseous suspension either just prior to or after its entry into the reduction chamber.

With respect to the matter of heat exchange with the exit gases from the reduction chamber, it is to be noted that the utilization of such is subject to the qualification that the temperature of the gases from the reduction chamber should be reduced as quickly as possible and to a substantial extent, for example below 500° C. They should not be permitted to remain at the high temperature of the reduction chamber for too long a period, nor should they be permitted to cool gradually.

The purpose of rapidly cooling these gases is to restrain the formation of objectionable amounts of carbon oxy-sulphide, which formation is strongly favored by the presence of reducing gas and free sulphur at the prevailing high temperature. The more rapidly this favorable temperature is reduced under such conditions, the less the tendency to form the oxy-sulphide. For this reason also, the rate of flow through the reduction chamber is so regulated that discharge of the gases from the chamber for the rapid external cooling will take place as promptly as possible after the reaction in the chamber has reached substantial and usually rapid completion.

However, if the heat exchange is properly conducted, for example by passing the exit gases through the heat exchanger at a suitably high velocity and substantially cooling them directly thereafter, the very considerable amount of sensible heat available in the large volume of high temperature exit gas, can ordinarily be taken substantial advantage of, without appreciable detriment, for heating the relatively small amount of cool reducing agent.

When the reducing gases have been preheated as discussed, they are then introduced into the reduction chamber in controlled amounts at a point adjoining the inlet for the hot roaster gases, and upon intermingling therewith at the high temperature in the reduction chamber, the sulphur dioxide will be rapidly and practically completely reduced to elemental sulphur, with the formation of carbon dioxide, steam, etc., depending upon the particular reducing agent used.

The auxiliary combustion of a supplemental portion of the reducing agent, in order to maintain the desired temperature in the reduction chamber, may take place either just prior to the injection of the reducing gas into the chamber or may be accomplished within the chamber itself.

While the sulphur recovery reaction is more favorable in the case of the reducing gases, even with the powdered fuel considerable advantage is presented over the former use of such carbon in the form of coke beds. Due to the fine state of division of the carbonaceous material and the high temperature of the reduction chamber, the solid carbonaceous particles will present a very extensive and highly incandescent reaction surface, and will react with the sulphur dioxide and air present in the roaster or smelter gases, with substantially complete consumption of the powdered carbon if due care is exercised in the regulation of the proportions of the reacting materials.

Sufficient oxidizing gas should be present in any event to assure, in so far as possible, the conversion of the solid carbon to a gaseous oxide before leaving the reduction chamber, to avoid the possibility of solid carbon being carried off in the gases. For the oxidation of the carbon, a plurality of the gases present in the chamber are available, e. g., both the sulphur dioxide and the air contained in the roaster or smelter gases, and also the carbon dioxide, which likewise is capable of reacting with the solid carbon to yield carbon monoxide under suitable circumstances.

After the exit gases from the reaction chamber have been rapidly passed in heat exchanging relationship with the incoming reducing gases, which exchange may be of slight or extensive degree, depending upon the factor of rapid cooling of the exit gases desired, as noted hereinbefore, these cooler gases are then passed directly to a waste heat boiler or similar device in which their temperature is quickly dropped appreciably below 500° C., for example, to 300°–400° C. and the lower the better, in order to avoid unduly prolonging the maintenance of temperature conditions favorable to the formation of carbon oxy-sulphide in appreciable amount.

In the cooler, of which a plurality may be used when the quantity and velocity of the gases so warrant, the gas temperature is quickly reduced to a suitably low point, and the condensed sulphur vapor may be removed from the gases in any suitable manner, either in liquid form in the waste heat boiler, or subsequently by any suitable type of separator, either of the mechanical baffle type, or by an electrostatic precipitator.

The exit gases from the boiler or other sulphur separator contain considerable amounts of carbon dioxide and nitrogen, and varying amounts of carbon monoxide, hydrogen sulphide, hydrogen, water, unreacted sulphide dioxide, and carbon oxy-sulphide, the amounts and presence of the same depending upon the nature of the reducing gases used and the reaction in the reduction chamber.

If the $SO_2$ is not present in sufficient amount to react with the $H_2S$ and undecomposed $COS$ to form elemental sulphur, according to the equations $$2H_2S + SO_2 = 2H_2O + 3S$$
$$2COS + SO_2 = 2CO_2 + 3S$$

an appropriate amount of sulphur dioxide gases may be introduced, and the mixed gases passed through a suitable catalyst which will accelerate the reaction between these gases to form elemental sulphur. For this purpose aluminum oxide, bauxite or similar catalyst may be used.

The catalyst used may be one which is capable of catalyzing both the COS and the $H_2S$ reactions, or different catalysts and separate catalyst chambers may be used, in one of which the $H_2S$ reaction is selectively catalyzed and in the other of which the COS reaction is catalyzed.

The type of catalyst used will to an extent, determine the temperature at which the catalytic reaction between these gases should be carried out and in accordance therewith, the gases may be heated or cooled to the most suitable temperature prior to being passed to the catalytic chamber or chambers. A portion or all of any supplementary heat required may be obtained, for example, from that absorbed in the waste heat boiler through which the exit gases from the reduction chamber were passed.

The elemental sulphur produced in the catalytic chamber or chambers, may be condensed and separated in any well known manner, and the residual gases discharged.

By proceeding in accordance with the foregoing, an economical and technically efficient process is provided which overcomes many of the usual objections to sulphur recovery processes of such type. The yield of sulphur is very high, the formation of material amounts of carbon oxy-sulphide is restrained, and the heat available from the process is very efficiently utilized.

The term reducing gas as used in the appended claims, also comprehends a gaseous suspension of powdered reducing material.

We claim:—

1. The process of producing elemental sulphur from gases containing sulphur dioxide which comprises, contacting the sulphur dioxide gases with carbonaceous reducing gas in a reaction chamber at an elevated temperature to rapidly react to produce elemental sulphur, passing said gases through said chamber at such rate of flow that the gases will be discharged therefrom substantially immediately upon completion of the sulphur producing reaction, and rapidly cooling said discharge gases, to restrain the formation of compounds of sulphur therein.

2. The process of producing elemental sulphur from gases containing sulphur dioxide which comprises, contacting said gases with carbonaceous reducing gas in a reaction chamber at a temperature of approximately 1000° C. or above, passing the gases through said chamber at such rate of flow that the gases will be discharged therefrom substantially immediately upon completion of the sulphur producing reactions, and rapidly cooling the discharge gases to below 500° C. to restrain the formation of compounds of sulphur therein.

3. The process of producing elemental sulphur from roaster or smelter gases which comprises, conducting said gases from the roaster or smelter to a reaction chamber, contacting said gases with carbonaceous reducing gas in said chamber while maintaining a temperature of approximately 1000° C. or above, to produce elemental sulphur, and then rapidly cooling the reacting gases to below 500° C. to restrain formation of the compounds of sulphur therein.

4. The process of producing elemental sulphur from roaster or smelter gases which comprises, conducting the hot gases from the roaster or smelter to a strongly preheated reaction chamber, introducing into said chamber a suitable amount of reducing gas adapted to reduce sulphur dioxide to elemental sulphur with the liberation of substantial amounts of heat, said reducing gas being preheated to a degree which will result in the attainment of a temperature above 1000° C. upon reaction in said reaction chamber, and rapidly passing said exothermically reacting gases through said chamber to promote the constant maintenance therein of a temperature above 1000° C.

5. The process of producing elemental sulphur from roaster or smelter gases which comprises, conducting said gases from the roaster or smelter to a reaction chamber without positive cooling in passage, contacting carbonaceous reducing gas with said roaster or smelter gases in said chamber to reduce the sulphur dioxide to elemental sulphur, and burning a supplemental portion of said reducing gas to provide any auxiliary heat necessary within said chamber.

6. The process of producing elemental sulphur from roaster or smelter gases which comprises conducting said gases from the roaster or smelter to a reaction chamber, introducing suitably preheated carbonaceous reducing gases into said chamber in amount sufficient to reduce the sulphur dioxide to elemental sulphur, maintaining a temperature of approximately 1000° C. or above in said reaction chamber while said reaction proceeds to substantial completion, rapidly cooling the exit gases from said chamber to below 500° C. to restrain the formation of compounds of sulphur, condensing and separating the elemental sulphur from said cooled gases, and passing the residual gases in contact with material capable of simultaneously catalyzing the oxidation of hydrogen sulphide and carbon oxy-sulphide to elemental sulphur.

7. The process of producing elemental sulphur from roaster or smelter gases which comprises conducting said gases from the roaster or smelter to a reaction chamber, introducing suitably preheated carbonaceous reducing gases into said chamber in amount sufficient to reduce the sulphur dioxide to elemental sulphur, maintaining a suitably elevated temperature in said reaction chamber while said reaction proceeds to substantial completion, rapidly cooling the exit gases from said chamber to restrain the formation of compounds of sulphur, condensing and separating the elemental sulphur from said cooled gases, and passing the residual gases in contact with a catalyst capable of causing the interaction of sulphur dioxide with hydrogen sulphide and then passing the gases in contact with a catalyst capable of causing the interaction of sulphur dioxide with carbon oxy-sulphide.

8. The process of producing elemental sulphur from roaster or smelter gases which comprises, introducing said gases into a reaction chamber at a temperature of approximately 1000° C. or above, introducing carbonaceous reducing gases into said chamber in amounts suitable to react with said roaster gases to obtain the sulphur in elemental form, rapidly passing the hot exit gases from said chamber in heat-exchanging relationship with said carbonaceous reducing gases prior to their introduction into the reaction chamber, and then quickly and substantially cooling the exit gases after such heat exchange to restrain the formation of compounds of sulphur.

In testimony whereof we affix our signatures.

RAYMOND F. BACON.
ISAAC BENCOWITZ.